US006965639B2

(12) United States Patent
Uesugi

(10) Patent No.: US 6,965,639 B2
(45) Date of Patent: Nov. 15, 2005

(54) COMMUNICATION APPARATUS AND TRANSMISSION TECHNIQUE SELECTION METHOD

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 425 days.

(21) Appl. No.: 10/239,923

(22) PCT Filed: Feb. 21, 2002

(86) PCT No.: PCT/JP02/01519

§ 371 (c)(1),
(2), (4) Date: Sep. 27, 2002

(87) PCT Pub. No.: WO02/069591

PCT Pub. Date: Sep. 6, 2002

(65) Prior Publication Data

US 2003/0053549 A1 Mar. 20, 2003

(30) Foreign Application Priority Data

Feb. 27, 2001 (JP) ............................. 2001-051622

(51) Int. Cl.[7] ............................. H04B 1/02; H04B 1/66
(52) U.S. Cl. ....................... 375/225; 455/102; 375/225; 370/543
(58) Field of Search ............................. 455/67.11, 69, 455/115.1, 102, 517, 522, 61, 103; 375/225; 370/543

(56) References Cited

U.S. PATENT DOCUMENTS 5,950,124 A * 9/1999 Trompower et al. ...... 455/422.1
5,983,101 A * 11/1999 Billstrom .................. 455/452.2
6,359,934 B1 * 3/2002 Yoshida ..................... 375/262
6,836,515 B1 * 12/2004 Kay et al. .................. 375/260

FOREIGN PATENT DOCUMENTS

| JP | 09186635 | 7/1997 |
| JP | 09307541 | 11/1997 |
| JP | 10093650 | 4/1998 |
| JP | 10247955 | 9/1998 |
| JP | 11275164 | 10/1999 |
| JP | 2001268019 | 9/2001 |

OTHER PUBLICATIONS

International Search Report dated Mar. 26, 2002.
M. Uesugi et al., "A Layered Demodulation Scheme for Adaptive Modulation", The Institute of Electronics, Information and Communication Engineers, vol. 2000, p. 320, Sep. 2000, with English translation.

(Continued)

*Primary Examiner*—Simon Nguyen
(74) *Attorney, Agent, or Firm*—Stevens, Davis, Miller & Mosher, LLP

(57) ABSTRACT

Channel quality estimating section 104 estimates the channel quality from the reception signal quality and outputs the result to transmission method determining section 105 and control signal dividing section 108. Transmission method determining section 105 determines a transmission method of a signal transmitted to communication partner from channel conditions and outputs the result to switch 106, switch 107 and control signal dividing section 108. Control signal dividing section 108 divides the transmission method information into high-speed control signal which is transmitted periodically and low-speed control signal which is transmitted on demand rather than periodically. Moreover, control signal dividing section 108 determines the combinations of low-speed control signal and high-speed control signal outputted from a tendency of communication quality, and outputs the result to modulator 114. Modulator 114 modulates the high-speed control signal and low-speed control signal, and outputs the result to multiplexer 115.

8 Claims, 14 Drawing Sheets

OTHER PUBLICATIONS

K. Umebayashi et al., "A Study on Blind Adaptive Modulation/Demodulation Based on a Concept of Software Radio", The Institute of Electronics, Information and Communication Engineers, vol. 2000, p. 488, Mar. 2000, with English translation.

M. Uesugi et al., "Inter-Symbol Interference Cancellation for Layered Demodulation with Bit Separated Coding", $12^{th}$ IEEE International Symposium on Indoor and Mobile Radio Communications, vol. 1, pggs. 107-111, Sep. 2001.

* cited by examiner

| TRANSMISSION METHOD | LOW-SPEED CONTROL SIGNAL | HIGH-SPEED CONTROL SIGNAL |
|---|---|---|
| BPSK | 00 | 0 |
| QPSK | 00 | 1 |
| 8PSK | 01 | 0 |
| | 01 | 1 |
| 16QAM | 10 | 0 |
| | 10 | 1 |
| 64QAM | 11 | 0 |
| | 11 | 1 |

FIG.7

| TRANSMISSION METHOD | LOW-SPEED CONTROL SIGNAL | HIGH-SPEED CONTROL SIGNAL |
|---|---|---|
| BPSK | 0 | 00 |
| QPSK | 0 | 01 |
| 8PSK | 1 | 00 |
| 16QAM | 0 | 10 |
| 16QAM | 1 | 01 |
| 64QAM | 0 | 11 |
| 64QAM | 1 | 10 |
| 64QAM | 1 | 11 |

FIG.10

COMMUNICATION APPARATUS AND TRANSMISSION TECHNIQUE SELECTION METHOD

TECHNICAL FIELD

The present invention relates to a communication apparatus and a transmission technique selection method, in particular, relates to a communication apparatus and a transmission technique selection method that preferably used for an adaptive modulation to improve transmission efficiency of packet communication, etc.

BACKGROUND ART

With the recent development of an Internet related art, it becomes possible to provide on the internet several kinds of services such as music on demand. In such a service, the transmission capacity of downlink channel is greatly increased. It is largely expected that high speed transmission in the downlink channel is to be achieved in order to realize services with large transmission capacity of the downlink channel. In addition, several technology developments are undergone on high speed transmission in downlink channel. As one technology of high speed transmission in downlink channel, a modulation method is adaptively updated in the transmission side, an adaptive modulation communication system carries out data transmission with a preferable efficiency.

A conventional adaptive modular ion communication system will be explained with reference to FIG. 1. FIG. 1 is a block diagram shows a conventional communication apparatus.

Communication apparatus 10 receives a radio signal in radio reception section 12 via antenna 11. Predetermined radio reception processing are performed on the received signal in radio reception section 12. The radio reception processed signal is outputted to demodulator 13. The data is demodulated in demodulator 13, and it is separated into a reception data and estimation value of the reception signal estimated in reception quality estimating section 61 of the receiving side to be described later using FIG. 5. Channel quality estimating section 14 estimates the channel quality from the estimation value of the separated quality of reception signal and outputs the result to transmission method determining section 15.

Transmission method determining section 15 determines transmission method of a signal transmitted to a communication partner from channel quality and outputs the result to switch 16, switch 17 and modulator 18. Here, An appropriate modulation technique is chosen among BPSK (Binary Phase Shift Keying), QPSK, 8PSK, 16QAM (sixteen Quadrature Amplitude Modulation), 64QAM (sixty four Quadrature Amplitude Modulation) modulation as a transmission method.

Switch 16 outputs the transmission data to either BPSK modulator 19, QPSK modulator 20, 8PSK modulator 21, 16QAM modulator 22, or 64QAM modulator 23 based on the transmission method determined in transmission method determining section 15.

BPSK modulator 19 performs phase modulation on the transmitting data so that 1 symbol corresponds to 1 bit (2 values) of information and outputs the result to switch 17. QPSK modulator 20 performs phase modulation on the transmitting data so that 1 symbol corresponds to 2 bits (4 values) of information and outputs the result to switch 17. 8PSK modulator 21 performs phase modulation on the transmitting data so that 1 symbol corresponds to 3 bits (8 values) of information and outputs the result to switch 17.

16QAM modulator 22 performs multi-level orthogonal amplitude modulation on the transmitting data so that 1 symbol corresponds to 4 bits (16 values) of information and outputs the result to switch 17. 64QAM modulator 23 performs multi-level orthogonal amplitude modulation on the transmitting data so that 1 symbol corresponds to 6 bits (64 values) of information and outputs the result to switch 17.

Switch 17 outputs the transmitting data which is modulated in either BPSK modulator 19, QPSK modulator 20, 8PSK modulator 21, 16QAM modulator 22 or 64QAM modulator based on a transmission method determined in transmission method determining section 15 to multiplexer 24.

Multiplexer 24 multiplexes the modulated transmitting data and the information of transmission method determined in transmission method determining section 15 and outputs the result as a transmission signal to radio transmission section 25. Radio transmission section 25 transmits a transmission signal via antenna 11 after carrying out predetermined radio processing.

The communication apparatus of the reception side will be explained below. FIG. 2 is a block diagram shows a conventional communication apparatus.

The radio signal transmitted from the aforementioned communication apparatus is received through antenna 51 and subjected to predetermined radio processing in radio reception section 52. The received signal outputted from radio reception section 52 is separated into receiving signal and control signal in control signal separation section 53 and outputted to switch 54. Here, a control signal shows a transmission method selected in the transmission side.

Switch 54 outputs the receiving signal to either BPSK demodulator 56, QPSK demodulator 57, 8PSK demodulator 58, 16QAM demodulator 59 or 64QAM demodulator 60 according to the control signal.

BPSK demodulator 56, QPSK demodulator 57, 8PSK demodulator 58, 16QAM demodulator 59 and 64QAM demodulator 60 each demodulates the respective receiving signal and outputs the obtained received signal to switch 55.

Switch 55 outputs the receiving signal which is separated in control signal separation section 53 after being demodulated by either BPSK demodulator 56, QPSK demodulator 57, 8PSK demodulator 58, 16QAM demodulator 59 and 64QAM demodulator 60 to reception quality estimating section 61 and other external sections.

Reception quality estimating section 61 estimates reception quality of the receiving signal and outputs it to modulator 62. Modulator 62 modulates the transmission data and reception quality information and outputs the result as a transmission signal to radio transmission section 63. Radio transmission section 63 transmits a transmission signal via antenna 51 after carrying out predetermined radio processing.

Operation of the conventional communication apparatus will be explained below.

FIG. 3 is a table showing the correspondence relation between transmission method and control signal. FIG. 3 shows the correspondence relation between transmission method and control signal. Here, transmission method shows the modulation technique and control signal which is periodically transmitted to a communication partner.

When the signal is transmitted with BPSK modulation technique, communication apparatus 10 uses "000" as a control signal. When the signal is transmitted with QPSK modulation technique, communication apparatus 10 uses "001" as a control signal. When the signal is transmitted with 8PSK modulation technique, communication apparatus 10 uses "010" as a control signal. When the signal is transmitted with 16QAM modulation technique, communication apparatus 10 uses "011" as a control signal. Finally, when the signal is transmitted with 64QAM modulation technique, communication apparatus 10 uses "100" as a control signal.

FIG. 4 shows a transmission example of the control signal. In FIG. 4, the horizontal axis represents time. In addition, a1, a2, a3 and a4 each represents decision standard when transmission method determining section 15 determines the transmission method.

Here, when the channel quality is worse than a1, communication apparatus 10 transmits the signal with BPSK. When the channel quality is more than a1 and worse than a2, communication apparatus 10 transmits the signal with QPSK. When the channel quality is more than a2 and worse than a3, communication apparatus 10 transmits the signal with 8PSK. When the channel quality is more than a3 and worse than a4, communication apparatus 10 transmits the signal with 16QAM. Finally, when the channel quality is more than a4, communication apparatus 10 transmits the signal with 64QAM.

At time t1, since the channel quality estimated by channel quality estimating section 14 is more than a1 and worse than a2, transmission method determining section 15 determines the transmission of signal with QPSK, and based on the table in FIG. 3, control signal "001" corresponds to conventional QPSK is outputted.

At the time t2, since the channel quality estimated by channel quality estimating section 14 is worse than a1, transmission method determining section 15 determines the transmission of signal with BPSK, and based on the table in FIG. 3, control signal "000" corresponds to BPSK is outputted. Similar to time t2, at time t3 and t4, transmission method determining section 15, based on the table in FIG. 3, outputs control signal "000" corresponds to BPSK.

Similar to time t1, at time t5, t6 and t7, transmission method determining section 15, based on the table in FIG. 3, outputs control signal "001" corresponds to QPSK.

At time t8, since the channel quality estimated by channel quality estimating section 14 is more than a2 and worse than a3, transmission method determining section 15 determines the transmission of signal with 8PSK, and based on the table in FIG. 3, outputs control signal "010" corresponds to 8PSK. Similar to time t8, at time t9 and t10, transmission method determining section 15, based on the table in FIG. 3, outputs control signal "010" corresponds to 8PSK.

At time t11, since the channel quality estimated by channel quality estimating section 14 is more than a3 and worse than a4, transmission method determining section 15 determines the transmission of signal with 16QAM, and based on the table in FIG. 3, outputs control signal "011" corresponds to 16QAM. Similar to time t11, at time t12, t13, t14 and t15, transmission method determining section 15, based on the table in FIG. 3, outputs control signal "011" corresponds to 16QAM.

At time t16, since the channel quality estimated by channel quality estimating section 14 is more than a4, transmission method determining section 15 determines the transmission of signal with 64QAM, and based on the table in FIG. 3, outputs control signal "100", corresponds to 64QAM. Similar to time t16, at time t17, transmission method determining section 15, based on the table in FIG. 3, outputs control signal "100" corresponds to 64QAM.

Accordingly, in the aforementioned adaptive modulation communication system, the communication apparatus of transmission side carries out transmission by updating adaptively modulation technique and carries out transmission after multiplexing modulation technique information such as (number of Multi-Level, etc.) in the transmission signal. Thus, the communication apparatus of reception side can perform demodulation based on modulation technique information even if the modulation technique is adaptively updated.

Moreover, there is a case where the information of the selected transmission method is not transmitted from the communication apparatus of transmission side, in such a case, the communication apparatus of reception side uses the so-called blind mode in which transmission method is estimated and then the received signal is demodulated.

FIG. 5 is a block diagram showing a configuration of a conventional communication apparatus using a blind mode. However, the sections similar to those shown in FIG. 2 are assigned the same reference numerals and explanation thereof will be omitted.

The communication apparatus of FIG. 5 comprises BPSK determining section 70, QPSK determining section 71, 8PSK determining section 72, 16QAM determining section 73, 64QAM determining section 74 and comparison section 75, a different point from the communication apparatus of FIG. 2 is that the demodulation is carried out after estimating the modulation technique of the received signal.

BPSK determining section 70 collects the phase distribution or amplitude distribution of a symbol pattern of the received signal, determines whether these distributions coincide with distribution of the BPSK symbol pattern and outputs the determination result to comparison section 75. QPSK determining section 71 collects the phase distribution or amplitude distribution of a symbol pattern of the received signal, determines whether these distributions coincide with distribution of the QPSK symbol pattern and outputs the determination result to comparison section 75. 8PSK determining section 72 collects the phase distribution or amplitude distribution of a symbol pattern of the received signal, determines whether these distributions coincide with distribution of the 8PSK symbol pattern and outputs the determination result to comparison section 75.

16QAM determining section 73 collects the phase distribution or amplitude distribution of a symbol pattern of the received signal, determines whether these distributions coincide with distribution of the 16QAM symbol pattern and outputs the determination result to comparison section 75. 64QAM determining section 74 collects the phase distribution or amplitude distribution of a symbol pattern of the received signal, determines whether these distributions coincide with distribution of the 64QAM symbol pattern and outputs the determination result to comparison section 75.

Comparison section 75 compares determination results outputted from BPSK determining section 70, QPSK determining section 71, 8PSK determining section 72, 16QAM determining section 73 and 64QAM determining section 74, and estimates the modulation method from the result in which the receiving signal symbol pattern is mostly coincide with a symbol pattern of each modulation technique. In addition, comparison section 75 carries out the switching between switch 54 and switch 55 from the estimating result of modulation method.

However, because the selected information shows the signal transmitted with a transmission technique which can be selected among all transmission techniques in the conventional apparatus is transmitted to a communication partner, the kinds of information of the selected transmission method increases and the data capacity used for distinguishing the information of such selected transmission method becomes large, hence, there is a problem that the capacity of the transmitting data increases further in every transmission unit.

Moreover, in blind mode in which a transmission method is estimated and reception processing is carried out in the reception side, there is a problem that a large number of calculations are required for estimation, or the error rate of estimation becomes large because there is a large number of candidates as an estimated transmission method.

DISCLOSURE OF INVENTION

A first object of the present invention is to provide a communication apparatus and a transmission technique selection method to reduce the communication capacity of a control signal which indicates the transmission method in a communication method selected among a plurality of transmission techniques.

Moreover, a second object of the present invention is to provide a communication apparatus and a transmission technique selection method to reduce the calculation required for estimation or to reduce the estimation error rate in blind mode.

These objects can be achieved in a communication apparatus by adaptively updating the transmission method every transmission unit, dividing the information of the selected transmission method into a large frame information and a small information and transmitting only the large frame information when it is necessary, that is to say, a communication apparatus adaptively updates the transmission method every transmission unit, divides the transmission method into a plurality of groups, determines group information in which a selected transmission method is included, transmits the group information when they are updated, and transmits periodically the information which shows a specific transmission method among the group.

BRIEF DESCRIPTION OF DRAWINGS

FIG. 7 is a table showing the correspondence relation between transmission method and control signal;

FIG. 10 is a table showing the correspondence relation between transmission method and control signal;

BEST MODE FOR CARRYING OUT THE INVENTION

Hereinafter, embodiments of the present invention will be specifically described with reference to the accompanying drawings.

(Embodiment 1)

Figure 1:
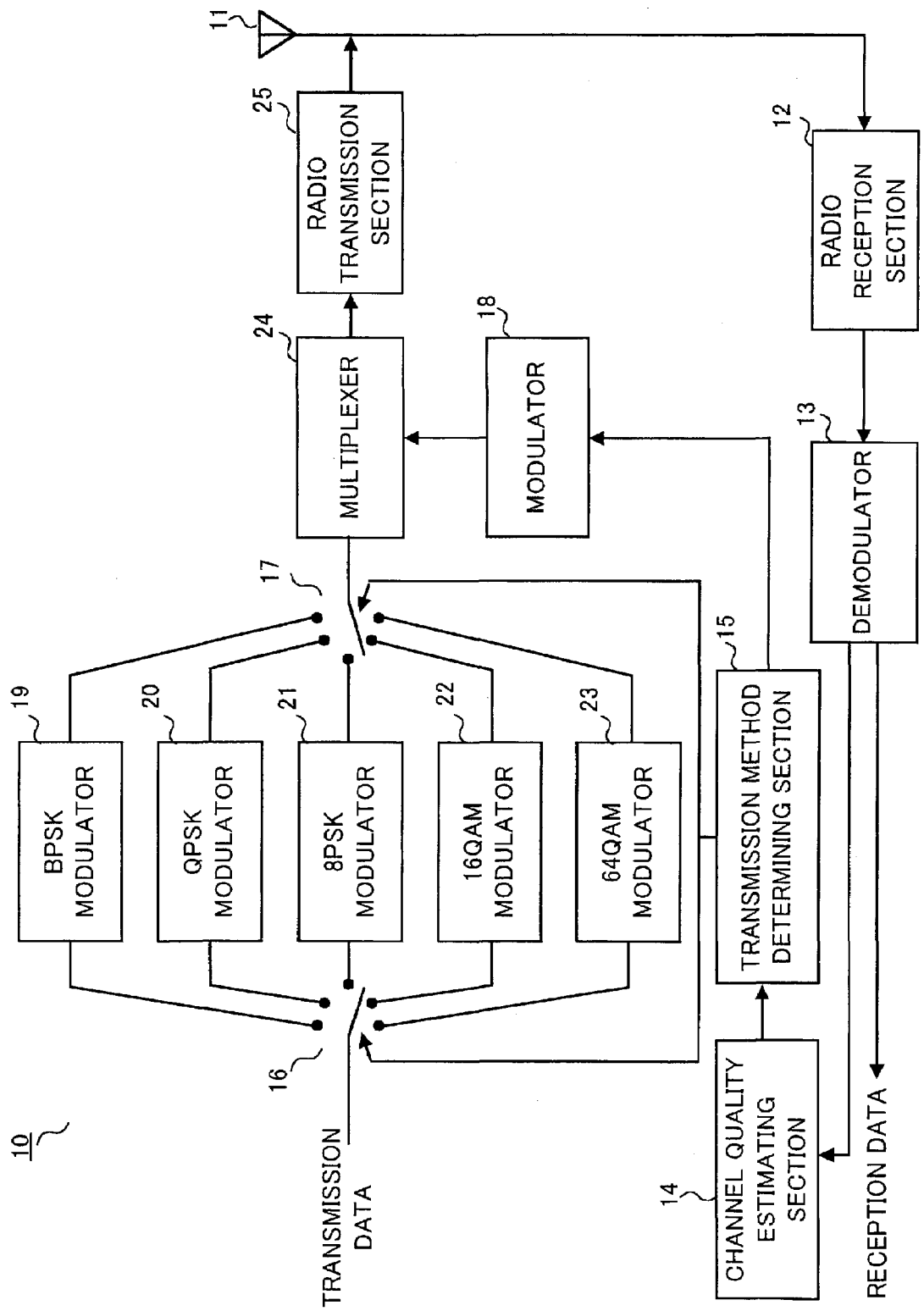
FIG. 1 is a block diagram shows a conventional communication apparatus.
Figure 2:
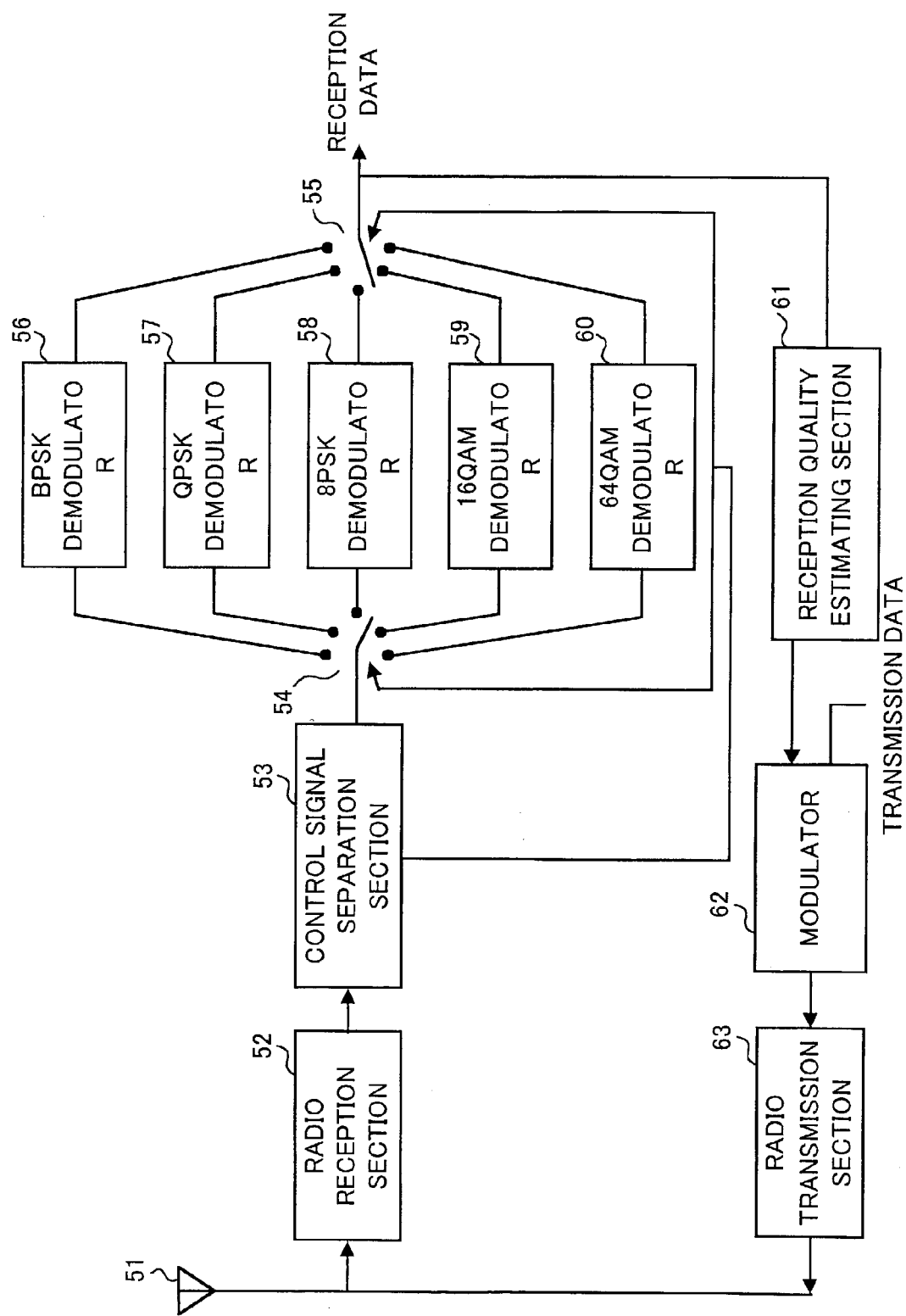
FIG. 2 is a block diagram shows a conventional communication apparatus.
Figure 3:
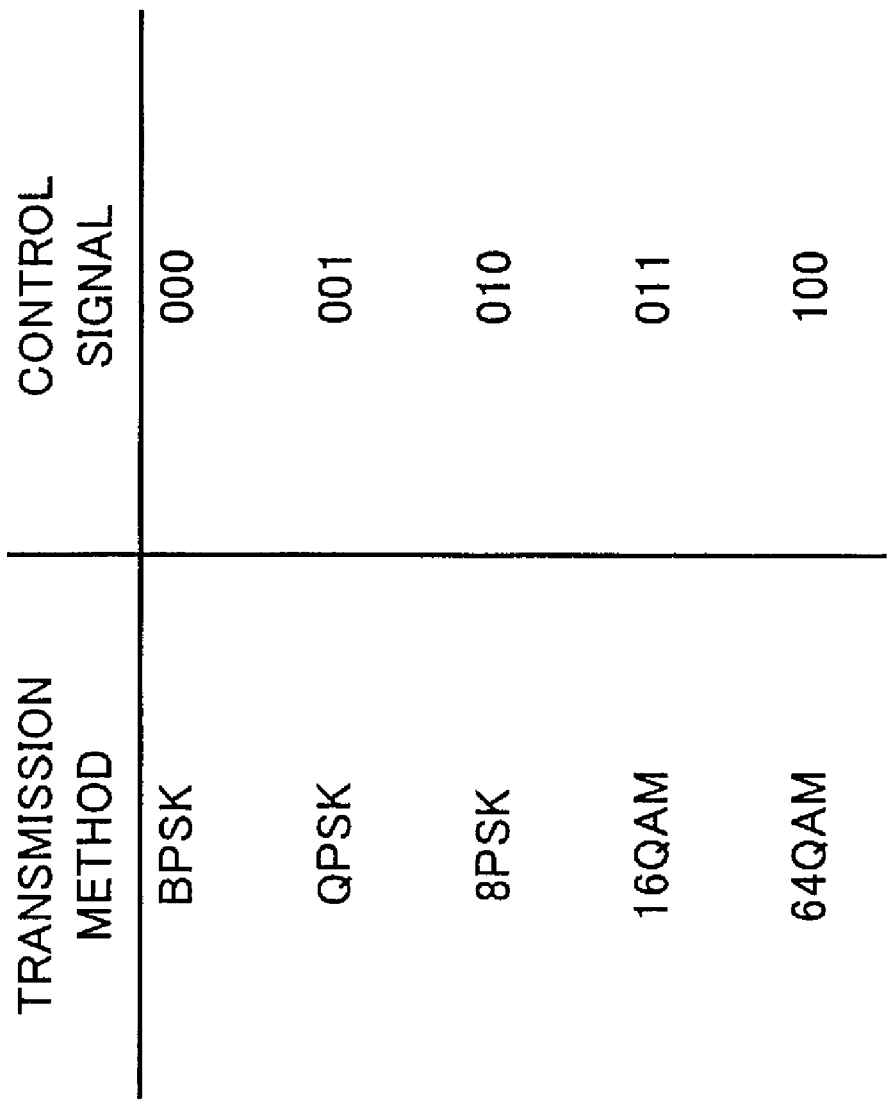
FIG. 3 is a table showing the correspondence relation between transmission method and control signal.
Figure 4:
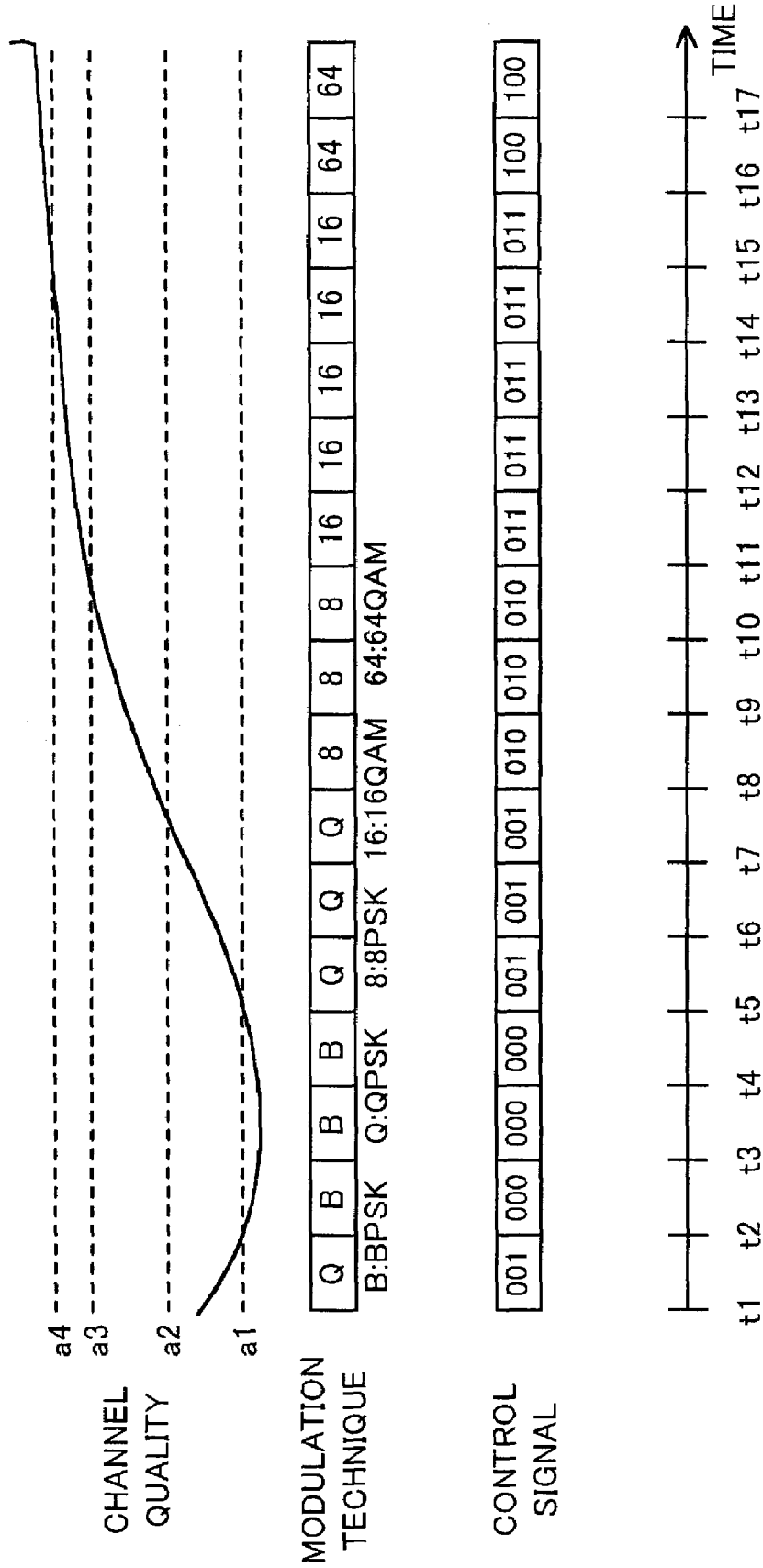
FIG. 4 shows a transmission example of a control signal.
Figure 5:
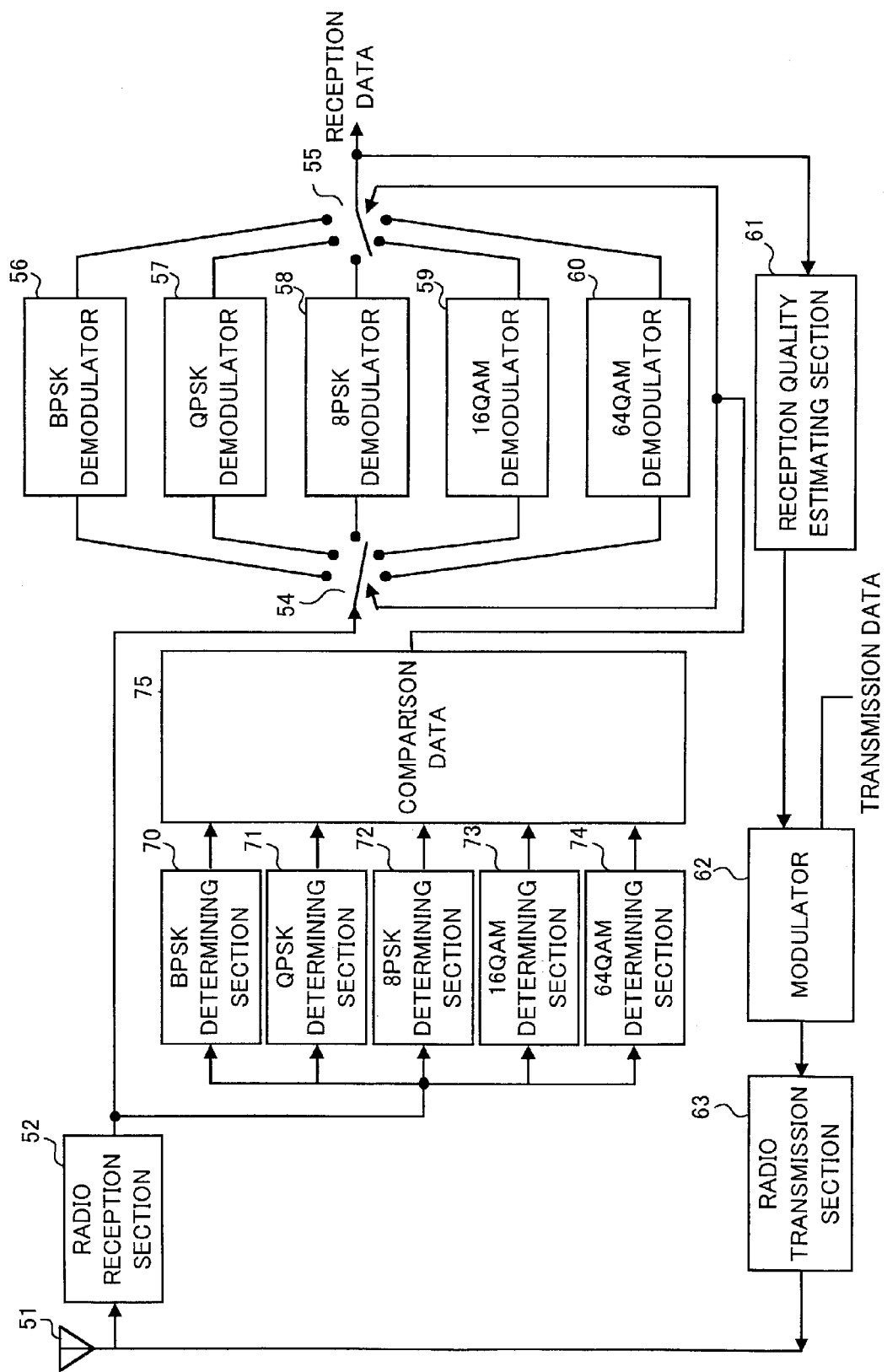
FIG. 5 is a block diagram showing a configuration of a conventional communication apparatus using a blind mode.
Figure 6:
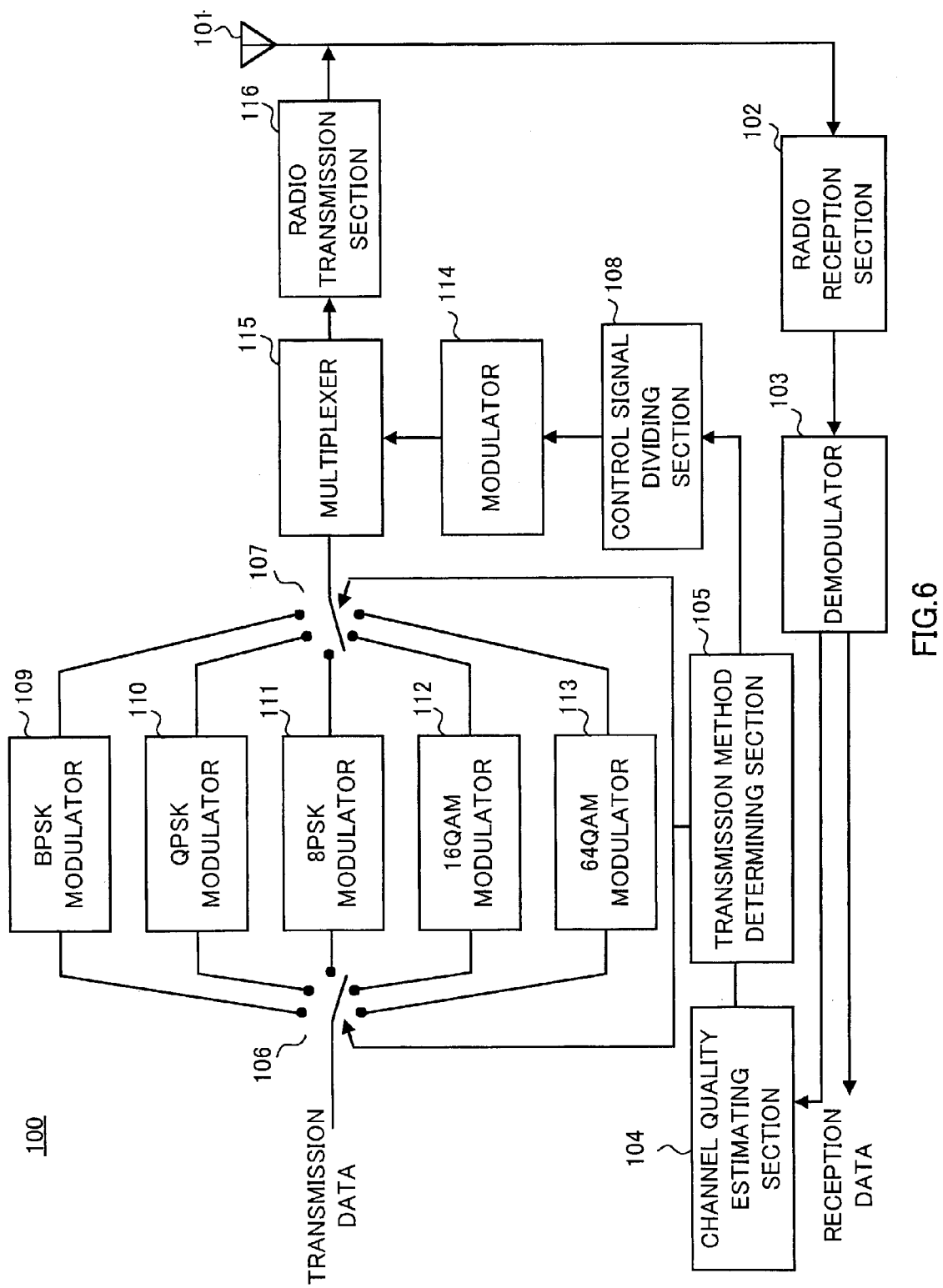
FIG. 6 is a block diagram showing a configuration of a communication apparatus according to Embodiment 1 of the present invention.

FIG. 6 is a block diagram showing a configuration of a communication apparatus according to Embodiment 1 of the present invention;

In FIG. 6, a communication terminal 100 mainly comprises antenna 101, radio reception section 102, demodulator 103, channel quality estimating section 104, transmission method determining section 105, switch 106, switch 107, control signal dividing section 108, BPSK modulator 109, QPSK modulator 110, 8PSK modulator 111, 16QAM modulator 112, 64QAM modulator 113, modulator 114, multiplexer 115 and radio transmission section 116.

Radio reception section 102 receives a radio signal via antenna 101, carries out predetermined radio reception processing and outputs the received signal to demodulator 103. Demodulator 103 demodulates the received signal, separates the received data and the estimation value of the received signal quality which is estimated in reception quality estimating section 163 of the reception side as to be described later in FIG. 9, and outputs the result to channel quality estimating section 104 and other external sections. Channel quality estimating section 104 estimates the channel quality from the estimation value of the separated quality of reception signal and outputs the result to transmission method determining section 105 and control signal dividing section 108.

Transmission method determining section 105 determines transmission method of a signal transmitted to communication partner from channel conditions and outputs the result to switch 106, switch 107 and control signal dividing section 108. Here, an appropriate modulation method is selected among BPSK, QPSK, 8PSK, 16QAM and 64QAM modulation method as a transmission method.

Channel conditions represent the state of communication channel such as channel quality, information of transmission power control, repetition information of a retransmission request, delay profile of the received signal, etc.

Switch 106 outputs transmission data to either BPSK modulator 109, QPSK modulator 110, 8PSK modulator 111, 16QAM modulator 112, and 64QAM modulator 113 based on the transmission method determined in transmission method determining section 105.

BPSK modulator 109 performs phase modulation on the transmission data so that 1 symbol corresponds to 2 bits (4 values) of information and outputs the result to switch 107. QPSK modulator 110 performs phase modulation on the transmission data so that 1 symbol corresponds to 2 bits (4 values) of information and outputs the result to switch 107. 8PSK modulator 111 performs phase modulation on the transmission data so that 1 symbol corresponds to 3 bits (8 values) of information and outputs the result to switch 107.

16QAM modulator 112 performs multi-level orthogonal amplitude modulation on the transmission data so that 1 symbol corresponds to 4 bits (16 values) of information and outputs the result to switch 107. 64QAM modulator 113 performs multi-level orthogonal amplitude modulation on the transmission data so that 1 symbol corresponds to 6 bits (64 values) of information and outputs the result to switch 107.

Switch 107 outputs transmission data which is modulated in either BPSK modulator 109, QPSK modulator 110, 8PSK modulator 111, 16QAM modulator 112, or 64QAM modulator 113 based on the transmission method determined in transmission method determining section 105 to multiplexer 115.

Control signal dividing section 108 divides the transmission method information into high-speed control signal which is transmitted periodically and a low-speed control signal which is transmitted on demand rather than periodically. In addition, control signal dividing section 108 determines the combinations of low-speed control signal and high-speed control signal outputted from a tendency of communication quality, and outputs the result to modulator 114. Detailed description of the operation of control signal dividing section 108 will be described later.

Modulator 114 modulates the high-speed control signal and low-speed control signal, and outputs the result to multiplexer 115.

Multiplexer 115 multiplexes the modulated transmission data, high-speed control signal and low-speed control signal as a transmission signal and outputs it to radio transmission section 116. Radio transmission section 116 transmits a transmission signal subjected to predetermined radio processing via antenna 101.

Operation of communication apparatus 100 according to the present embodiment will be explained below. FIG. 7 is a table showing the correspondence relation between transmission method and control signal. In FIG. 7, the transmission method corresponds to two control signal. Here, the transmission method shows the modulation technique, and two control signals show high-speed control signal which is transmitted periodically and low-speed control signal which is transmitted on demand rather than periodically.

When the signal is transmitted with BPSK modulation technique, low-speed control signal uses "00" while high-speed control signal uses "0". When the signal is transmitted with QPSK modulation technique, low-speed control signal uses "00", while high-speed control signal uses "1" or low-speed control signal uses "01" while high-speed control signal uses "0". Similarly, when a signal is transmitted with either 8PSK, 16QAM and 64QAM modulation method, the used low-speed control signal and high-speed control signal are shown in FIG. 7.

Figure 8:
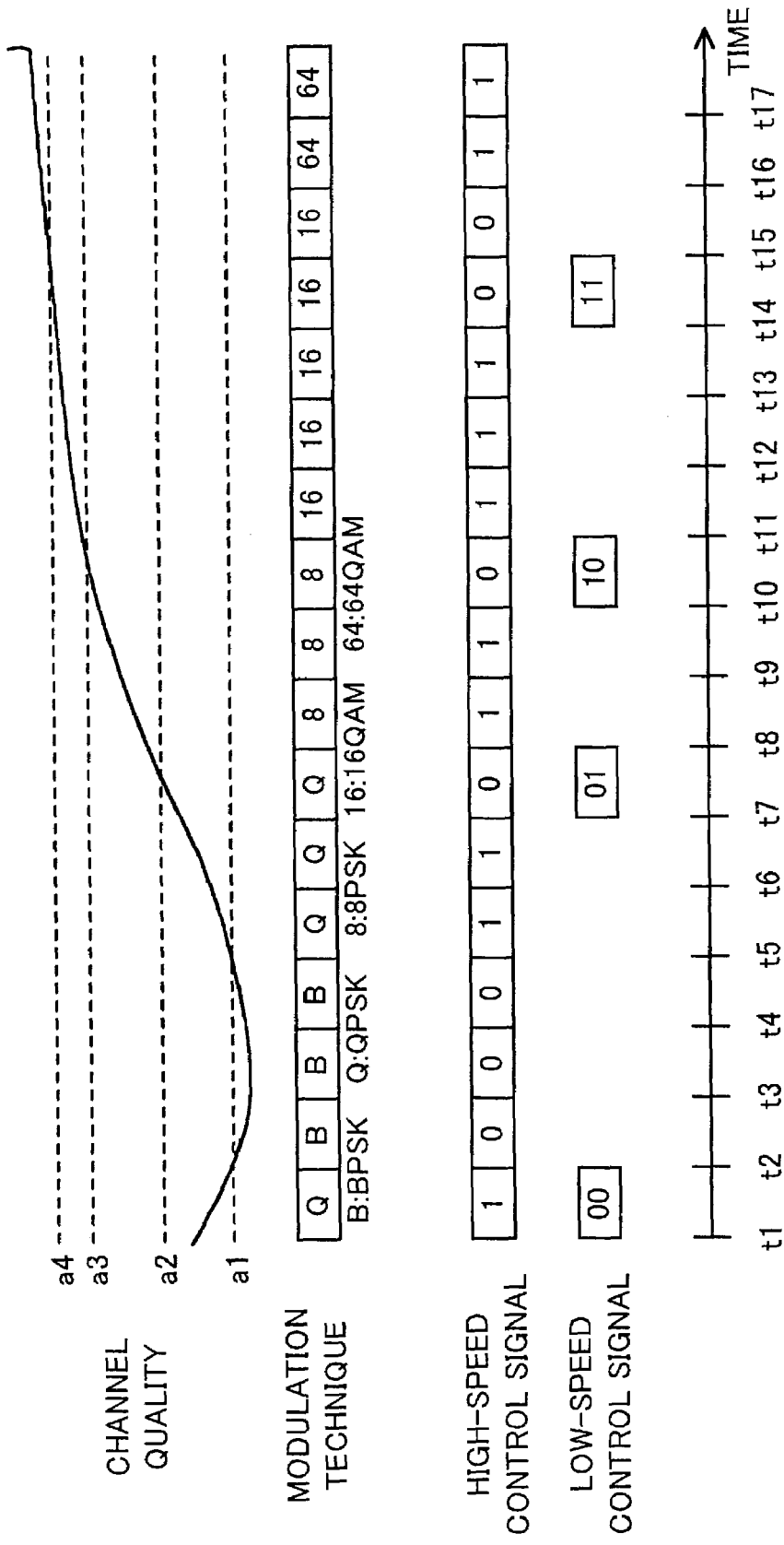
FIG. 8 shows a transmission example of a control signal.

FIG. 8 shows a transmission example of the control signal. In FIG. 8, the horizontal axis represents time. Moreover, a1, a2, a3 and a4 each represents the decision standard when transmission method determining section 105 determines the transmission method by which the signal is transmitted.

Here, when the channel quality is worse than a1, communication apparatus 100 transmits the signal with BPSK. When the channel quality is more than a1 and worse than a2, communication apparatus 100 transmits the signal with QPSK. When the channel quality is more than a2 and worse than a3, communication apparatus 100 transmits the signal with 8PSK. When the channel quality is more than a3 and worse than a4, communication apparatus 100 transmits the signal with 16QAM. Finally, when the channel quality is more than a4, communication apparatus 100 transmits the signal with 64QAM.

At time t1, since the channel quality estimated by channel quality estimating section 104 is more than a1 and worse than a2, transmission method determining section 105 determines the transmission of signal with QPSK. Control signal dividing section 108 outputs, based on the table in FIG. 7, low-speed control signal "00" and high-speed control signal "1" correspond to QPSK.

At time t2, since the channel quality estimated by channel quality estimating section 104 is worse than a1, transmission method determining section 105 determines the transmission of signal with BPSK. Control signal dividing section 108 outputs, based on the table in FIG. 7, low-speed control signal "00", and high-speed control signal "0" correspond to BPSK.

Similar to time t2, at time t3 and t4, control signal dividing section 108 outputs, based on the table in FIG. 7, low-speed control signal "00" and high-speed control signal "0" correspond to BPSK.

At time t5, since the channel quality estimated by channel quality estimating section 104 is more than a1 and worse than a2, transmission method determining section 105 determines the transmission of signal with QPSK. Control signal dividing section 108 outputs, based on the table in FIG. 7, low-speed control signal "00" and high-speed control signal "1" correspond to QPSK.

Similar to time t5, at time t6, control signal dividing section 108 outputs, based on the table in FIG. 7, low-speed control signal "00" and high-speed control signal "1" correspond to QPSK.

At time t7, since the channel quality estimated by channel quality estimating section 104 is more than a1 and worse than a2, transmission method determining section 105 determines the transmission of signal with QPSK. With the improvement of the channel quality, control signal dividing section 108 decides that the probability to update the modulation method from QPSK to 8PSK is higher than the probability to update the modulation method from QPSK to BPSK. In addition, control signal dividing section 108 outputs, based on the table in FIG. 7, low-speed control signal "01" corresponds to QPSK and 8PSK and high-speed control signal "0" corresponds to QPSK.

At time t8, as the channel quality estimated by channel quality estimating section 104 is more than a2 and worse than a3, transmission method determining section 105 determines the transmission of signal with 8PSK. Control signal dividing section 108 outputs, based on the table in FIG. 7, low-speed control signal "01" and high-speed control signal "1" correspond to 8PSK.

Similar to time t8, at time t9, control signal dividing section 108 outputs, based on the table in FIG. 7, low-speed control signal "01" and high-speed control signal "1" correspond to 8PSK.

At time t10, as the channel quality estimated by channel quality estimating section 104 is more than a2 and worse than a3, transmission method determining section 105 determines the transmission of signal with 8PSK. With the improvement of the channel quality, control signal dividing section 108 decides that the probability to update the modulation method from 8PSK to 16QAM is higher than the probability to update the modulation method from 8PSK to QPSK. In addition, control signal dividing section 108 outputs, based on the table in FIG. 7, low-speed control signal "10" corresponds to 8PSK and 16QAM and high-speed control signal "0" corresponds to 8PSK.

At time t11, because the channel quality estimated by channel quality estimating section 104 is more than a3 and worse than a4, transmission method determining section 105 determines the transmission of signal with 16QAM. Control signal dividing section 108 outputs, based on the table in FIG. 7, low-speed control signal "10" and high-speed control signal "1" correspond to 16QAM.

Similar to time t11, at time t12 and t13, control signal dividing section 108 outputs, based on the table in FIG. 7, low-speed control signal "10" and high-speed control signal "1" correspond to 16QAM.

At time t14, as the channel quality estimated by channel quality estimating section 104 is more than a3 and worse than a4, transmission method determining section 105 determines the transmission of signal with 16QAM. With the improvement of the channel quality, control signal dividing section 108 decides that the probability to update the modulation method from 16QAM to 64QAM is higher than the probability to update the modulation method from 16QAM to 8PSK. In addition, control signal dividing section 108 outputs, based on the table shown in FIG. 7, low-speed control signal "11" corresponds to 16QAM and 64QAM and high-speed control signal "0" corresponds to 16QAM.

Similar to time t14, at time t15, control signal dividing section 108 outputs, based on the table in FIG. 7, low-speed control signal "11" and high-speed control signal "0" correspond to 16QAM.

At time t16, as the channel quality estimated by channel quality estimating section 104 is more than a4, transmission method determining section 105 determines the transmission of signal with 64QAM. Control signal dividing section 108 outputs, based on the table in FIG. 7, low-speed control signal "11" and high-speed control signal "1" correspond to 64QAM.

Similar to time t16, at time t17, control signal dividing section 108 outputs, based on the table in FIG. 7, low-speed control signal "11" and high-speed control signal "1" correspond to 64QAM.

According to the communication apparatus of the present embodiment, by dividing the transmission methods into a plurality of groups, deciding the group information in which the selected transmission method is included, transmits the group information when group information are updated, and transmits periodically the information which shows a specific transmission method among from groups, it is possible to reduce the size of a control signal transmitting periodically, and also possible to reduce the communication capacity of a control signal which indicates the transmission method.

Figure 9:
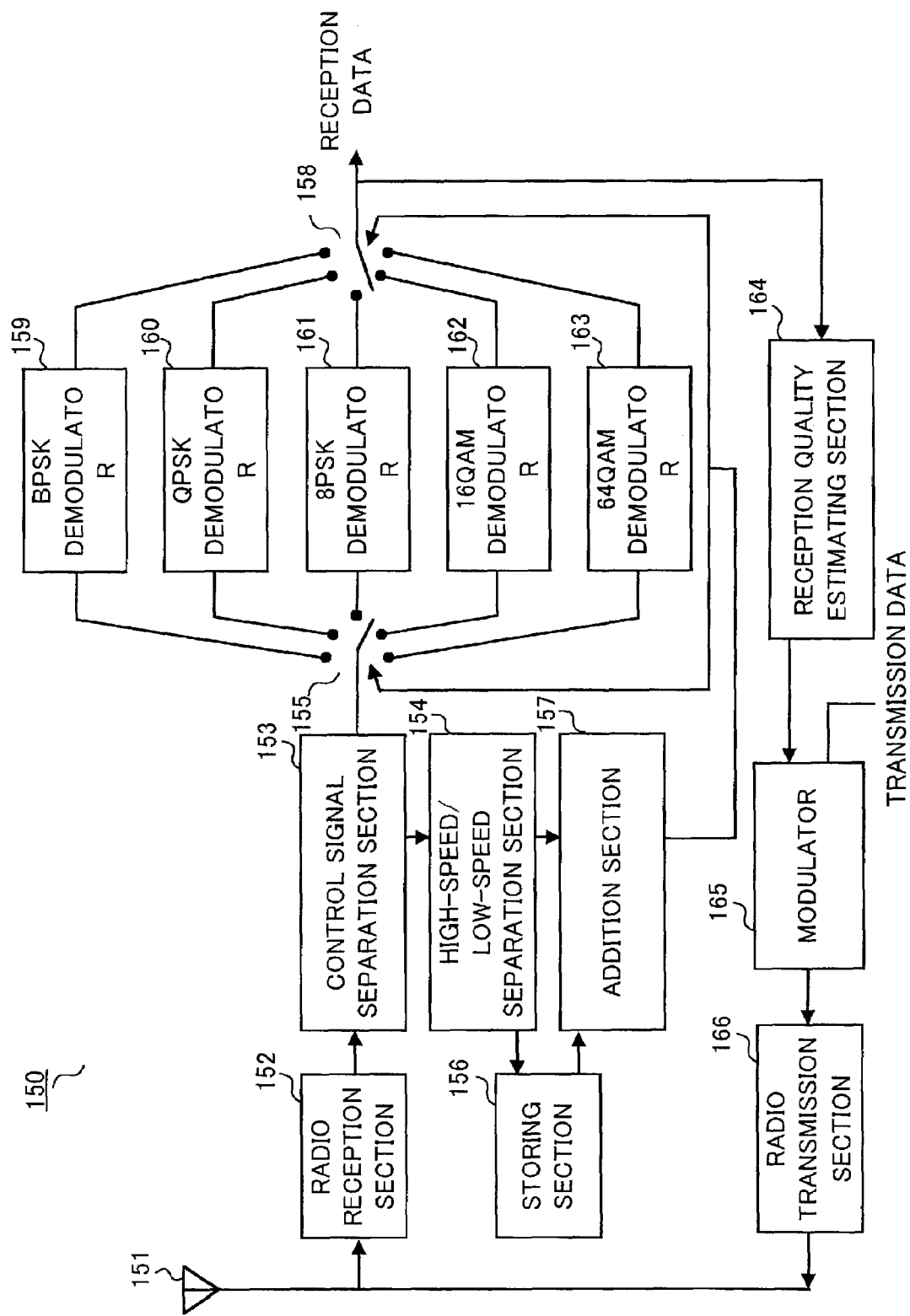
FIG. 9 is a block diagram showing a configuration of a communication apparatus according to the aforementioned embodiment.

An explanation of a communication apparatus receiving the signal transmitted from communication apparatus 100 will be given below. FIG. 9 is a block diagram showing a configuration of a communication apparatus according to the above-mentioned embodiment.

In FIG. 9, a communication terminal 150 mainly comprises antenna 151, radio reception section 152, control signal separation section 153, high-speed/low-speed separation section 154, switch 155, storing section 156, addition section 157, switch 158, BPSK demodulator 159, QPSK demodulator 160, 8PSK demodulator 161, 16QAM demodulator 162, 64QAM demodulator 163, reception quality estimating section 164, modulator 165 and radio transmission section 166.

Radio reception section 152 receives a radio signal via antenna 151, carries out predetermined radio reception processing and outputs the obtained received signal to control signal separation section 153.

Control signal separation section 153 extracts the control signal from the received signal and outputs it to high-speed/low-speed separation section 154. Control signal separation section 153 further outputs the received signal to switch 155.

High-speed/low-speed separation section 154 divides the control signal to high-speed control signal and low-speed control signal, low-speed control signal is outputted to storing section 156 while high-speed signal is outputted to addition section 157. Storing section 156 stores the low-speed control signal and outputs it to addition section 157. In addition, when a newly low-speed control signal is inputted, storing section 156 reflects it in the storing contents and outputs it to addition section 157.

Addition section 157 combines low-speed control signal and high-speed control signal, and a selected information of the transmission method is generated then outputted to switch 155 and switch 158. For example, addition section 157 adds low-speed control signal and high-speed control signal and generates the selected information of the transmission method. Switch 155 outputs transmission data to either BPSK demodulator 159, QPSK demodulator 160, 8PSK demodulator 161, 16QAM demodulator 162, and 64QAM demodulator 163 based on selected information of the transmission method generated in addition section 157.

BPSK demodulator 159 demodulates the received signal using BPSK method and outputs the result to switch 158. QPSK demodulator 160 demodulates the received signal using QPSK method and outputs the result to switch 158. 8PSK demodulator 161 demodulates the received signal using 8PSK method and outputs the result to switch 158. 16QAM demodulator 162 demodulates the received signal using 16QAM method and outputs the result to switch 158. 64QAM demodulator 163 demodulates the received signal using 64QAM method and outputs the result to switch 158.

Switch 158 selects the signal outputted from either BPSK demodulator 159, QPSK demodulator 160, 8PSK demodulator 161, 16QAM demodulator 162, and 64QAM demodulator 163 based on the selected information of the transmission method generated in addition section 157 and outputs the result to reception quality estimating section 164 and other external sections.

Reception quality estimating section 164 estimates reception quality of the received data and outputs it to modulator 165. Modulator 165 modulates transmission data and reception quality information and outputs the result as a transmission signal to radio transmission section 166. Radio transmission section 166 transmits transmission signal via antenna 151 after carrying out predetermined radio processing.

According to the communication apparatus of the present embodiment, by receiving the group information in which the transmission method is included and information which specifies transmission method among the group and by specifying transmission method from an information which specifies group information, it is possible to reduce the size of control signal transmitting periodically, and also possible to reduce the communication capacity of control signal which indicates the transmission method.

Moreover, although communication apparatus 100 of the present embodiment predicts the updating of a transmission method beforehand from communication quality of the receiving signal, but the present embodiment is not limited to this and it is possible to execute updating of transmission method along with prediction of the timing of transmission of low-speed control signal.

In addition, the combination of low-speed control signal and high-speed control signal is not limited in particular. An example of a combination of low-speed control signal and high-speed control signal is shown below.

FIG. 10 is a table showing the correspondence relation between transmission method and control signal. In FIG. 10, the transmission method corresponds to two control signals. Here, transmission method shows the modulation technique, and the two control signals show high speed control signal which is transmitted periodically and low speed control signal which is transmitted on demand rather than periodically.

When a signal is transmitted using BPSK modulation technique, low-speed control signal uses "0" while high-speed control signal uses "00". When a signal is transmitted using QPSK modulation technique, low-speed control signal uses "0" while high-speed control signal uses "01" or low-speed control signal uses "1" while high-speed control signal uses "00". Similarly, when a signal is transmitted using either 8PSK, 16QAM and 64QAM modulation method, the used low-speed control signal and high-speed control signal are shown in FIG. 10.

Figure 11:
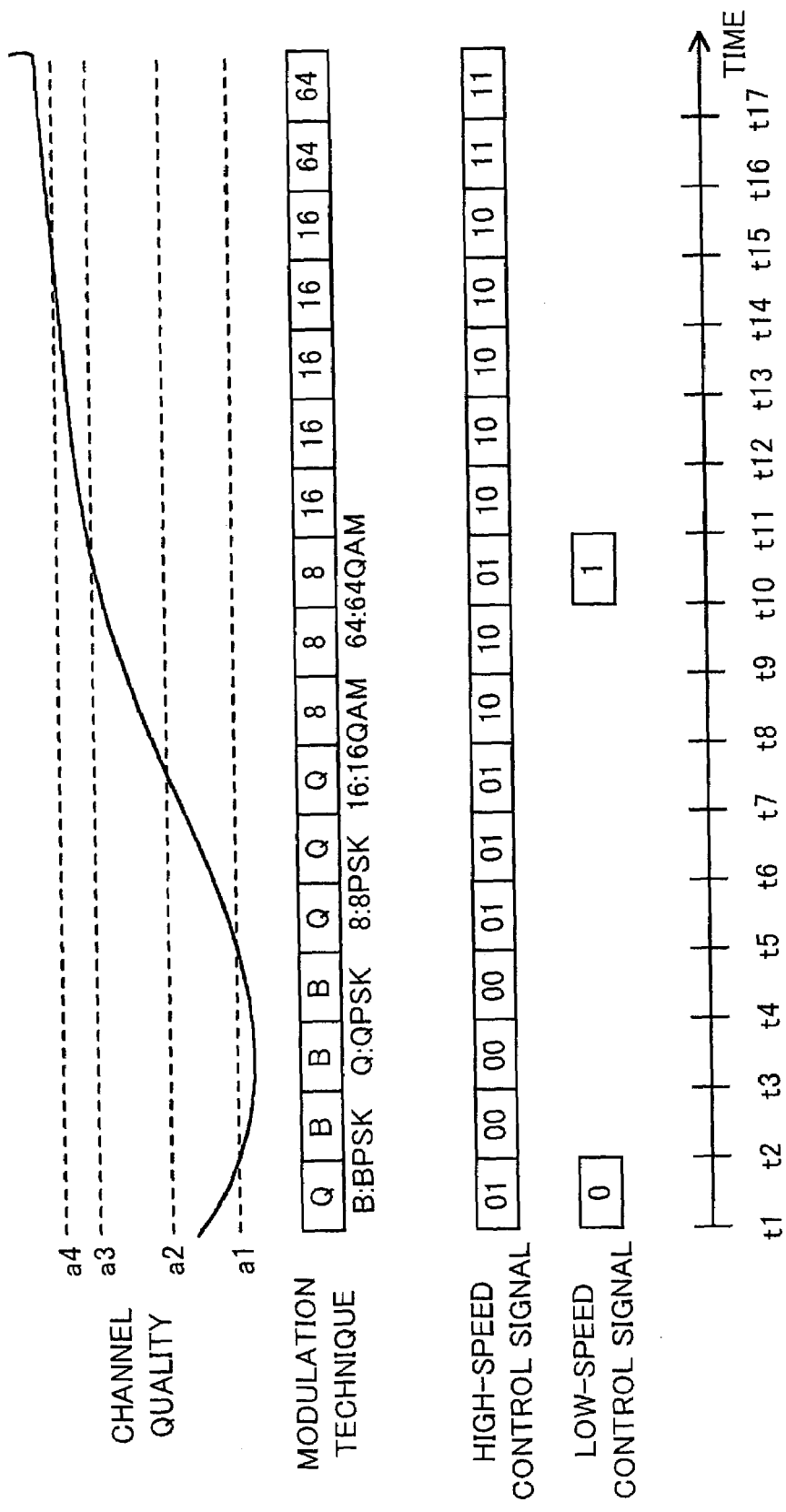
FIG. 11 shows a transmission example of a control signal.

Operation of communication apparatus 100 in the case when the above-mentioned two control signals are used will be explained. FIG. 11 shows transmission example of control signals. In FIG. 11, the horizontal axis represents time. Moreover, a1, a2, a3 and a4 each represents decision standard when transmission method determining section 105 determines the transmission method by which a signal is transmitted. Operation of determining the modulation method from channel quality is the same as the operation of the above-mentioned embodiment.

At time t1, since the channel quality estimated by channel quality estimating section 104 is more than a1 and worse than a2, transmission method determining section 105 determines the transmission of signal with QPSK. Control signal dividing section 108 outputs, based on the table in FIG. 10, low-speed control signal "0" and high-speed control signal "01" correspond to QPSK.

At time t2, as the channel quality estimated by channel quality estimating section 104 is less than a1, transmission method determining section 105 determines the transmission of signal with BPSK. Control signal dividing section 108 outputs, based on the table in FIG. 10, low-speed control signal "0" and high-speed control signal "00" correspond to BPSK.

Similar to time t2, at time t3 and t4, control signal dividing section 108 outputs, based on the table in FIG. 10, low-speed control signal "0" and high-speed control signal "00" correspond to BPSK.

Similar to time t1, at time t5, t6 and t7, control signal dividing section 108 outputs, based on the table in FIG. 10, low-speed control signal "0" and high-speed control signal "01" correspond to QPSK.

At time t8, as the channel quality estimated by channel quality estimating section 104 is more than a2 and worse than a3, transmission method determining section 105 determines the transmission of signal with 8PSK. Control signal dividing section 108 outputs, based on the table in FIG. 10, low-speed control signal "0" and high-speed control signal "10" correspond to 8PSK.

Similar to time t8, at time t9, control signal dividing section 108 outputs, based on the table in FIG. 10, low-speed control signal "0" and high-speed control signal "10" correspond to 8PSK.

At time t10, as the channel quality estimated by channel quality estimating section 104 is more than a2 and worse than a3, transmission method determining section 105 determines the transmission of signal with 8PSK. With the improvement of the channel quality, control signal dividing section 108 decides that the probability to update the modulation method from 8PSK to 16QAM is higher than the probability to update the modulation method from 8PSK to QPSK. In addition, control signal dividing section 108 outputs, based on the table in FIG. 10, low-speed control signal "1" corresponds to 16QAM and 64QAM and high-speed control signal "01" corresponds to 8PSK.

At time t11, as the channel quality estimated by channel quality estimating section 104 is more than a3 and worse than a4, transmission method determining section 105 determines the transmission of signal with 16QAM. Control signal dividing section 108 outputs, based on the table in FIG. 10, low-speed control signal "1" and high-speed control signal "10" correspond to 16QAM.

Similar to time t11, at time t12, t13, t14 and t15, control signal dividing section 108 outputs, based on the table in FIG. 10, low-speed control signal "1" and high-speed control signal "10" correspond to 16QAM.

At time t16, since the channel quality estimated by channel quality estimating section 104 is more than a4, transmission method determining section 105 determines the transmission of signal with 64QAM. Control signal dividing section 108 outputs, based on the table in FIG. 10, low-speed control signal "1" and high-speed control signal "11" correspond to 64QAM.

Similar to time t16, at time t17, control signal dividing section 108 outputs, based on the table in FIG. 10, low-speed control signal "1" and high-speed control signal "11" correspond to 16QAM.

Accordingly, the communication apparatus of the present embodiment can reduce data capacity of the low-speed control signal. In such a case, because the kinds of the transmission method which can be covered by one low-speed control signal increase with increasing data capacity of high-speed control signal, transmission method can be updated without transmitting low-speed control signal again even in case when communication channel quality fluctuates suddenly.

(Embodiment 2)

Figure 12:
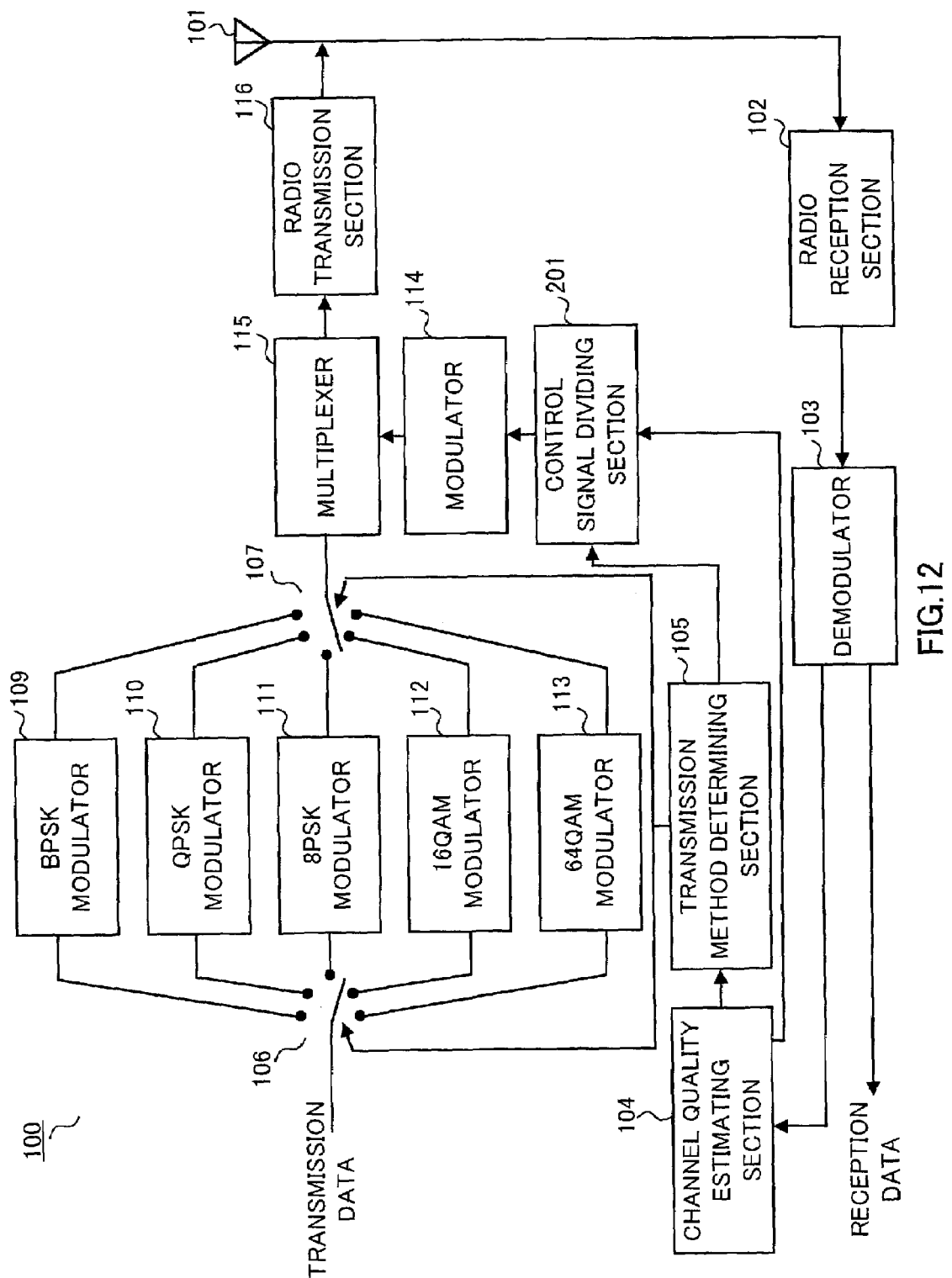
FIG. 12 is a block diagram showing a configuration of a communication apparatus according to Embodiment 2 of the present invention.

FIG. 12 is a block diagram showing a configuration of a communication apparatus according to Embodiment 2 of the present invention. However, the sections similar to those shown in FIG. 6 are assigned the same reference numerals and explanation thereof will be omitted.

Communication apparatus 200 shown in FIG. 12 comprises control signal dividing section 201, and divides the transmission methods into a plurality of groups, determines the group information in which a selected transmission method is included, transmits only the group information when group information are updated, and does not transmit information which shows a specific transmission method among the group which is a different point from the communication apparatus shown in FIG. 6.

Channel quality estimating section 104 estimates the channel quality from the quality estimation value of the reception signal separated in demodulator 103 and outputs the result to transmission method determining section 105 and control signal dividing section 201. Transmission method determining section 105 determines transmission method of a signal transmitting to communication partner using channel quality and outputs the result to switch 106, switch 107 and control signal dividing section 201.

Control signal dividing section 201 divides the transmission method information into high-speed control signal which is transmitted periodically and low-speed control signal which is transmitted on demand rather than periodically, and outputs only low-speed control signal to modulator 114. Detailed description of the operation of control signal dividing section 201 will be described later.

Modulator 114 modulates low-speed control signal, and outputs the result to multiplexer 115.

Figure 13:
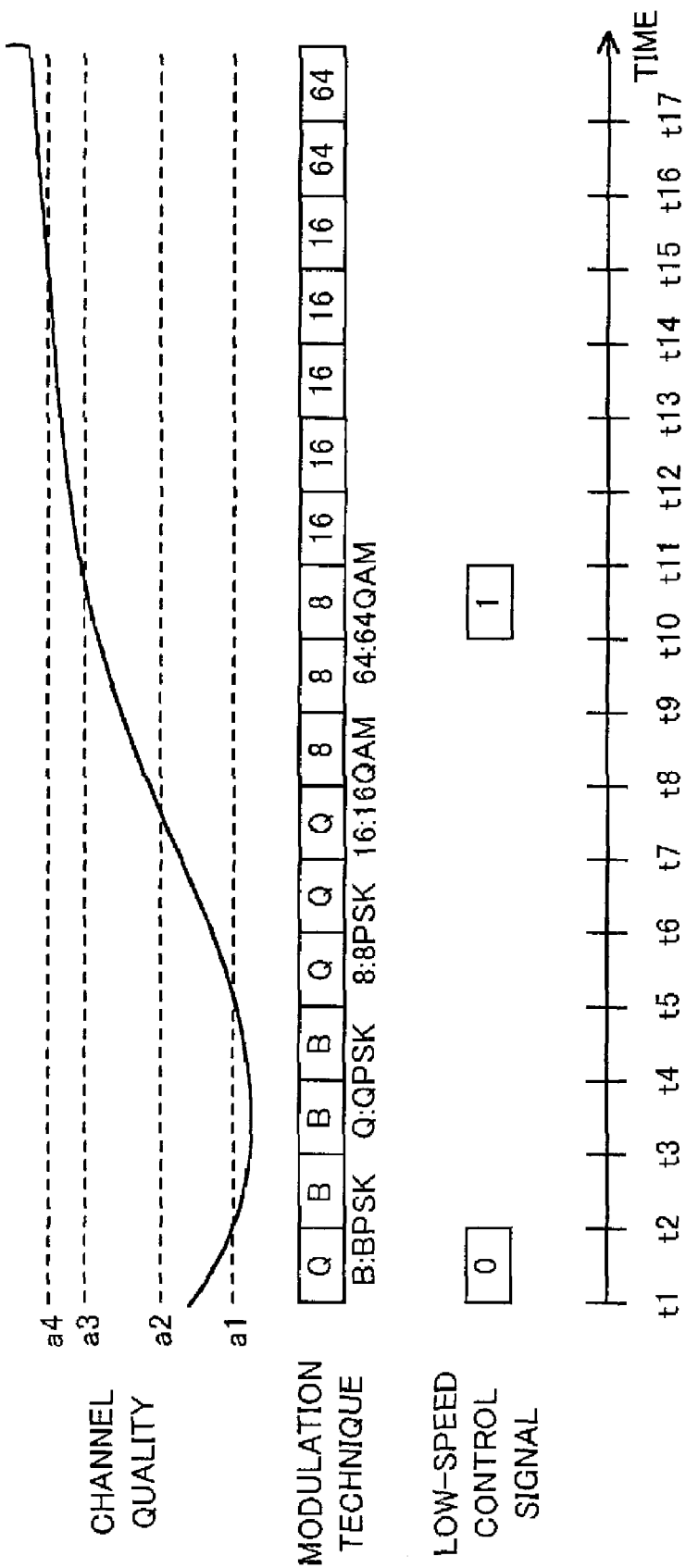
FIG. 13 shows a transmission example of a control signal.

Operation of communication apparatus 200 according to the present embodiment will be explained below. FIG. 13 shows a transmission example of control signal. In FIG. 13, the horizontal axis represents time. Moreover, a1, a2, a3 and a4 each represents the decision standard when transmission method determining section 105 determines the transmission method by which the signal is transmitted. Operation of determining a modulation method from the channel quality is the same as the operation of the above-mentioned embodiment.

At time t1, since the channel quality estimated by channel quality estimating section 104 is more than a1 and worse than a2, transmission method determining section 105 determines the transmission of signal with QPSK. Control signal dividing section 201 outputs, based on the table in FIG. 10, low-speed control signal "0" corresponds to QPSK.

At time t2, because the channel quality estimated by channel quality estimating section 104 is less than a1, transmission method determining section 105 determines the transmission of signal with BPSK. Control signal dividing section 201 outputs, based on the table in FIG. 10, low-speed control signal "0" corresponds to BPSK.

Similar to time t2, at time t3 and t4, control signal dividing section 201 outputs, based on the table in FIG. 10, low-speed control signal "0" corresponds to BPSK.

Similar to time t1, at time t5, t6 and t7, control signal dividing section 201 outputs, based on the table in FIG. 10, low-speed control signal "0" corresponds to QPSK.

At time t8, as the channel quality estimated by channel quality estimating section 104 is more than a2 and worse than a3, transmission method determining section 105 determines the transmission of signal with 8PSK. Control signal dividing section 201 outputs, based on the table in FIG. 10, low-speed control signal "0" corresponds to 8PSK.

Similar to time t8, at time t9, control signal dividing section 201 outputs, based on the table in FIG. 10, low-speed control signal "0" corresponds to 8PSK.

At time t10, as the channel quality estimated by channel quality estimating section 104 is more than a2 and worse than a3, transmission method determining section 105 determines the transmission of signal with 8PSK. With the improvement of the channel quality, control signal dividing section 201 decides that the probability to update the modulation method from 8PSK to 16QAM is higher than the probability to update the modulation method from 8PSK to QPSK. In addition, control signal dividing section 201 outputs, based on the table in FIG. 10, low-speed control signal "1" corresponds to QPSK, 8PSK, 16QAM and 64QAM.

At time t11, because the channel quality estimated by channel quality estimating section 104 is more than a3 and worse than a4, transmission method determining section 105 determines the transmission of signal with 16QAM. Control signal dividing section 201 outputs, based on the table in FIG. 10, low-speed control signal "1" corresponds to 16QAM.

Similar to time t11, at time t12, t13, t14 and t15, control signal dividing section 201 outputs, based on the table in FIG. 10, low-speed control signal "1" corresponds to 16QAM.

At time t16, as the channel quality estimated by channel quality estimating section 104 is more than a4, transmission method determining section 105 determines the transmission of signal with 64QAM. Control signal dividing section 201 outputs, based on the table in FIG. 10, low-speed control signal "1" corresponds to 64QAM.

Similar to time t16, at time t17, control signal dividing section 201 outputs, based on the table in FIG. 10, low-speed control signal "1" corresponds to 64QAM.

According to the communication apparatus of the present embodiment, by dividing the transmission methods into a plurality of groups, deciding the group information in which the selected transmission method is included and transmitting the group information when group information are updated, and by estimating the transmission method in the reception side by comparing between only symbol pattern of the plurality of the transmission methods shown by group information and symbol pattern of the received signal, it is possible to reduce the possibility of error in estimation as the number of candidates of the transmission method becomes small. Moreover, the amount of calculations required for estimation can also be decreased.

Figure 14:
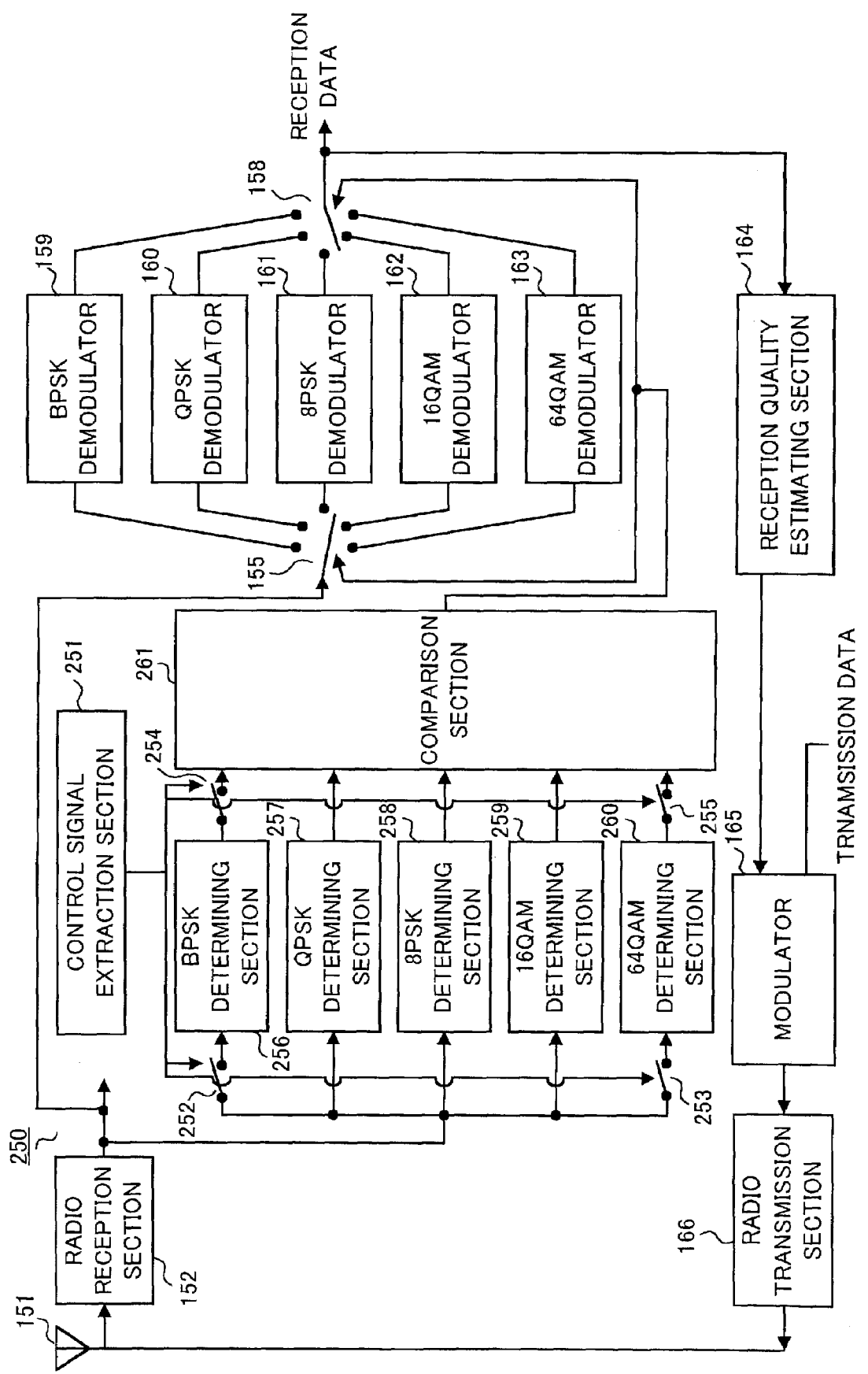
FIG. 14 is a block diagram showing a configuration of a communication apparatus according to the aforementioned embodiment.

An explanation of a communication apparatus receiving radio signal transmitted from communication apparatus 200 will be given below. FIG. 14 is a block diagram showing a configuration of a communication apparatus according to the aforementioned embodiment. However, the sections similar to those shown in FIG. 9 are assigned the same reference numerals and explanation thereof will be omitted.

Communication apparatus 250 of FIG. 14 comprises control signal extraction section 251, switch 252, switch 253, switch 254, switch 255, BPSK determining section 256, QPSK determining section 257, 8PSK determining section 258, 16QAM determining section 259, 64QAM determining section 260 and comparison section 261, a different point from the communication apparatus of FIG. 9 is that the demodulation is carried out after estimating the modulation technique of reception signal.

Radio reception section 152 receives a radio signal through an antenna 151, carries out predetermined radio processing, and outputs the obtained received signal to switch 155, control signal extraction section 251, switch 252, switch 253, QPSK determining section 257, 8PSK determining section 258 and 16QAM determining section 259.

Control signal extraction section 251 extracts low-speed control signal from the received signal and the transmission method which can be employed is determined, when the transmission method is either BPSK, QPSK, 8PSK or 16QAM, a circuit of switch 252 and switch 254 is connected while a circuit of switch 253 and switch 255 is disconnected.

Moreover, when the transmission method is either QPSK, 8PSK, 16QAM or 64QAM, a circuit of switch 252 and switch 254 is disconnected while a circuit of switch 253 and switch 255 is connected.

BPSK determining section 256 collects the phase distribution or amplitude distribution of a symbol pattern of received signal, determines whether these distributions coincide with distribution of BPSK symbol pattern and outputs the determination result to comparison section 261. QPSK determining section 257 collects the phase distribution or amplitude distribution of a symbol pattern of received signal, determines whether these distributions coincide with distribution of QPSK symbol pattern and outputs the determination result to comparison section 261. 8PSK determining section 258 collects the phase distribution or amplitude distribution of a symbol pattern of received signal, determines whether these distributions coincide with distribution of 8PSK symbol pattern and outputs the determination result to comparison section 261.

16QAM determining section 259 collects the phase distribution or amplitude distribution of a symbol pattern of received signal, determines whether these distributions coincide with distribution of 16QAM symbol pattern and outputs the determination result to comparison section 261. 64QAM determining section 260 collects the phase distribution or amplitude distribution of a symbol pattern of received signal, determines whether these distributions coincide with distribution of 64QAM symbol pattern and outputs the determination result to comparison section 261.

Comparison section 261 compares the determination results outputted from BPSK determining section 256, QPSK determining section 257, 8PSK determining section 258, 16QAM determining section 259 and 64QAM determining section 260, and estimates the modulation method from the result in which the distribution of the received signal symbol pattern is mostly coincide with symbol pattern of each modulation technique. In addition, comparison section 261 carries out the switching between switch 155 and switch 158 from the estimation result of modulation method.

According to the communication apparatus of the present embodiment, by receiving the group information included the transmission method, estimating the transmission method by comparing between only the symbol pattern of a plurality of the transmission methods shown by group information and symbol pattern of the received signal, the possibility of error in estimation can be reduced as the number of candidates of estimated transmission method decreases. Moreover, the amount of calculations required for estimation can also be decreased.

For example, when either of BPSK, QPSK, 8PSK, 16QAM and 64QAM is used for signal transmission, the error in estimation of 16QAM as 64QAM is eliminated in communication apparatus of reception side by transmission of low-speed control signal and specifying the modulation method as BPSK, QPSK, 8PSK and 16QAM.

Moreover, the error in estimation of QPSK as BPSK is eliminated in the communication apparatus of the receiving side by transmission of low-speed control signal and specifying the modulation method as QPSK, 8PSK, 16QAM and 64QAM.

In addition, the communication apparatus of the present invention selects a modulation method among a plurality of modulation methods depending on channel quality, although the selection is carried out among a plurality of modulation techniques, but the selection is not limited to this and the selection method can be any method of which the transmission capacity of the communication is changed such as error correction method, spreading factor of CDMA, interleaving method, puncturing method, etc.

In addition, the communication apparatus of the present invention can employ and compromise base station apparatus and communication terminal apparatus.

As it is clear from the above explanation and according to the communication apparatus and transmission technique selection method of the present invention, the communication capacity of control signal which indicates the transmission method in a communication method selected among a plurality of transmission techniques can be reduced.

The present application is based on the Japanese Patent Application No. 2001-051622 filed on Feb. 27, 2001, entire content of which is expressly incorporated by reference herein.

INDUSTRIAL APPLICABILITY

The present invention is applicable to radio communication apparatus, base station apparatus and communication terminal apparatus.

What is claimed is:

1. A communication apparatus that selects between a plurality of transmission methods and performs communication, the communication apparatus comprising:
   a transmission method determiner that selects one of the plurality of transmission methods upon a transmission of a signal;
   a control signal divider that divides information of the plurality of transmission methods into low speed control signals and high speed control signals, associates the low speed control signals and the high speed control signals with the plurality of transmission methods, and determines which combination of a low speed control signal and a high speed control signal corresponds to the transmission method selected in the transmission method determiner; and
   a transmitter that, when the low speed control signal in the combination determined in the control signal divider differs from a low speed control signal that was transmitted in a previous transmission, transmits the low speed control signal in the combination determined in the control signal divider.

2. The communication apparatus according to claim 1, wherein the transmitter transmits the high speed control signal in the combination determined in the control signal divider on a regular basis.

3. The communication apparatus according to claim 1, wherein:
   the transmission method determiner selects the one of the plurality of transmission methods based on channel conditions; and
   the control signal divider determines the combination of the low speed control signal and high speed control signal from channel quality information.

4. A communication apparatus on a receiving side that communicates with the communication apparatus of claim 2, said communication apparatus on the receiving side comprising:
   a control signal separator that extracts a low speed control signal and a high speed control signal from a received signal;
   a separator that separates the low speed control signal and the high speed control signal;
   a storage that stores the low speed control signal; and
   a recoverer that determines a transmission method from the low speed control signal and the high speed control signal and recovers data in the received signal using the determined transmission method.

5. A communication apparatus on a receiving side that communicates with the communication apparatus of claim 1, said communication apparatus on the receiving side comprising:
   a control signal extractor that extracts a low speed control signal from a received signal;
   a transmission method estimator that estimates a transmission method applied to the received signal from transmission methods specified by the low speed control signal; and
   a recoverer that recovers the received signal using the estimated transmission method.

6. A base station apparatus with a communication apparatus, said communication apparatus comprising:

a transmission method determiner that selects one of the plurality of transmission methods upon a transmission of a signal;

a control signal divider that divides information of the plurality of transmission methods into low speed control signals and high speed control signals, associates the low speed control signals and the high speed control signals with the plurality of transmission methods, and determines which combination of a low speed control signal and a high speed control signal corresponds to the transmission method selected in the transmission method determiner; and a transmitter that, when the low speed control signal in the combination determined in the control signal divider differs from a low speed control signal that was transmitted in a previous transmission, transmits the low speed control signal in the combination determined in the control signal divider.

7. A communication terminal apparatus comprising a communication apparatus, said communication apparatus comprising:

a transmission method determiner that selects one of the plurality of transmission methods upon a transmission of a signal;

a control signal divider that divides information of the plurality of transmission methods into low speed control signals and high speed control signals, associates the low speed control signals and the high speed control signals with the plurality of transmission methods, and determines which combination of a low speed control signal and a high speed control signal corresponds to the transmission method selected in the transmission method determiner; and a transmitter that, when the low speed control signal in the combination determined in the control signal divider differs from a low speed control signal that was transmitted in a previous transmission, transmits the low speed control signal in the combination determined in the control signal divider.

8. A method of selecting between a plurality of transmission methods and performing communication, the method comprising:

on the transmitting side:

selecting one of the plurality of transmission methods upon a transmission of a signal;

dividing information of the plurality of transmission methods into low speed control signals and high speed control signals and associating the low speed control signals and the high speed control signals with the plurality of transmission methods;

determining which combination of a low speed control signal and a high speed control signal corresponds to the one of the plurality of transmission methods; and transmitting the high speed control signal in the determined combination on a regular basis, and, when the low speed control signal in the determined combination differs from a low speed control signal that was transmitted in a previous transmission, transmitting the low speed control signal in the determined combination; and on the receiving side:

extracting a low speed control signal and a high speed control signal from a received signal;

separating the low speed control signal and the high speed control signal;

storing the low speed control signal;

determining the transmission method of the received signal from the low speed control signal and the high speed control signal; and recovering the received signal using the determined transmission method.

* * * * *